April 22, 1958 — G. K. C. HARDESTY — 2,831,282
DUO-PANEL WITH AUXILIARY PRINTED CIRCUIT PANEL
Filed June 28, 1957

INVENTOR
GEORGE K.C. HARDESTY

BY George Sipkin
B. L. Zangwill
ATTORNEYS

United States Patent Office 2,831,282
Patented Apr. 22, 1958

2,831,282

DUO-PANEL WITH AUXILIARY PRINTED CIRCUIT PANEL

George K. C. Hardesty, Mayo, Md.

Application June 28, 1957, Serial No. 668,839

16 Claims. (Cl. 40—130)

(Granted under Title 35, U. S. Code (1952), sec. 266)

The invention described herein may be manufactured and used by or for the Government of the United States of America for governmental purposes without the payment of any royalties thereon or therefor.

This application is a continuation-in-part of applicant's copending application Serial No. 369,976, filed July 23, 1953, for Duo-Panel Edge Illumination System.

This invention relates to the illumination of dials, panels, pointers and the like and particularly to the transmission of electric current from a source exteriorly of a panel to a miniature electric lamp, or lamps, within the panel.

More particularly, this invention relates to the provision of a current-carrying and lamp-mounting panel for use with panel illuminating system.

In applicant's copending application, Serial No. 369,976, referred to above, there is described an invention which has for its object the provision of an improved panel edge illumination system that is particularly suitable in locations in which the preservation of a high degree of dark adaptation of personnel is required. In that application there is described a system that operates on the principle of transmission of light through a transparent plastic panel by total internal specular reflection to an indicia-bearing panel that is in poor contact with the surfaces of the first panel. This provides an extremely efficient system since little or no light is lost in transmission. While the duo-panel system disclosed in applicant's copending application is extremely efficient, the lamps are carried by the inner or light-transmitting panel, which, with some installations renders the lamps inaccessible. Also, with some installations, the problem of transmitting electric current to the lamps may be involved.

It is, therefore, a general object of this invention to provide an improved panel illuminating system.

A further object of this invention is the provision of an illuminating panel that is relatively free of complications.

A still further object of this invention is to provide an illuminating panel wherein the electric lamps are readily accessible for inspection and replacement.

A more specific object of the present invention is the provision of a current-carrying, lamp-mounting panel for use with uni-panel and/or multi-panel illuminating systems.

Briefly, in accordance with the present invention there is provided a current-carrying lamp-mounting panel comprising a plastic core or sheet sandwiched between two metal laminations or printed circuits. The plastic core may be transparent, translucent or opaque as desired, and it may be colored for contrast or to function as an optical filter, as described hereinafter.

In one embodiment of the invention, the current-carrying, lamp-mounting panel is given additional utility by using it as a separating panel between a light-transmitting panel and an indicia-bearing panel of applicant's duo-panel system; an example of a separating panel is illustrated in Fig. 3 of applicant's copending application Serial No. 369,976, referred to heretofore.

In a second embodiment of the invention, the current-carrying, lamp-mounting panel is located below the light-transmitting panel of a duo-panel system, with the lamps accessible from the indicia or outer panel of such system. Here, the new panel is given additional utility by using the current-carrying laminations for energizing electric switches or other accessories of the panel.

In the third embodiment of the invention, the current-carrying, lamp-mounting panel is located below or in back of the light-transmitting panel of a uni-panel system, with the lamps accessible from the front of such system.

Thus, in each of the illustrated embodiments of the inventor, the new panel not only mounts the lamps in a readily accessible manner and carries electric current to such lamps, it also functions as a separating panel in a duo-panel system and its electric conductors are available for energizing other equipment.

The invention, together with the above and other objects and advantages, is set forth in more technical detail in the following description and accompanying drawing in which like reference characters designate like parts throughout the several views and wherein.

In each of the figures of the drawings, the thickness of the light-transmitting panel, the indicia panel, the optical separating space between such panels, the conductors, the laminations and the various accessories is exaggerated for clarity of illustration.

Figure 1:
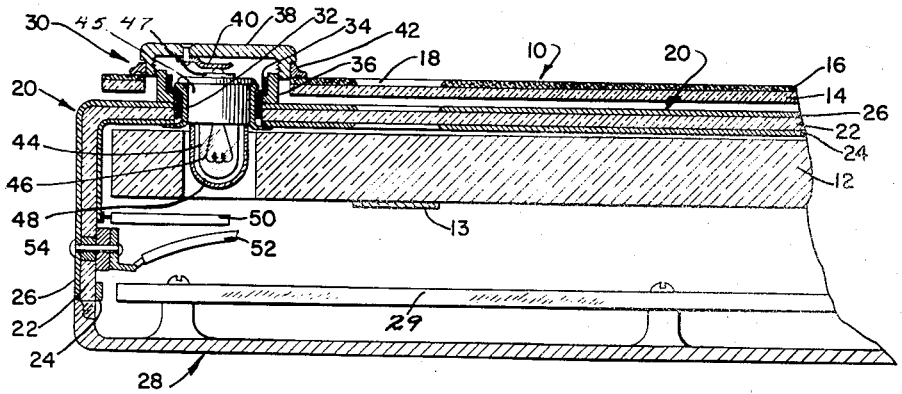
Fig. 1 is a sectional view through a portion of an illuminated panel illustrating one embodiment of the invention wherein the electric circuits and the miniature lamps are carried by a separating panel between the light-transmitting and indicia-bearing panels of a duo-panel illumination system.

In Fig. 1 of the drawings, for purpose of illustration, the invention is shown applied to a fragment of an edge-illuminated panel particularly adapted for use aboard ships, aircraft or the like. The structure designated generally by reference numeral 10, includes a panel or light-transmitting member 12 made of a highly transparent sheet or plate of suitable size, having its front and back surfaces in parallel relation to each other and preferably polished to provide smooth optical surfaces for total internal specular reflection of light therebetween. The light-transmitting member is preferably fabricated from an acrylic resin or methyl methacrylate plastic material of the thermoplastic type such as, for example, commerical "Plexiglas" or "Lucite."

Spaced above the light-transmitting panel is an indicia-bearing panel 14, made of a translucent light-diffusing material, preferably a white plastic. An opaque lamination or coating 16, preferably black, is superimposed on the indicia panel. Indicia 18, only one of which is shown in Fig. 1, are formed on the top or obverse surface of the indicia panel by omitting or removing areas of the opaque coating to thereby expose to view desired areas of the translucent panel 14. A light diffusing patch 13 is placed in optical contact with the bottom surface of light-transmitting panel 12 directly opposite each of the indicia formed on the obverse surface of the indicia panel.

In accordance with the Fig. 1 embodiment of this invention, the light-transmitting panel 12 and the indicia-bearing panel 14 are optically separated by a current-carrying, lamp-mounting panel 20. For purpose of illustration, the panels 12, 20 and 14 are shown separated by air spaces. However, in actual practice, these panels may be in physical contact with each other. Panel 20 comprises a center core or sheet of plastic 22 sandwiched between and forming insulation for a pair of metal conductor laminations or printed circuits 24 and 26. As shown, the conductors are cut or etched away to form openings therein directly beneath the indicia formed on panel 14 for transmission of light to such indicia. Preferably, the plastic core 22 of panel 20 is made of transparent, light-transmitting plastic for passage of light therethrough to the indicia. This plastic core may, however, be colored for contrast or so as to function as an optical filter. Panel 20 is molded into a tray or box like structure for attachment to a mating box-like structure 28, the two such structures combining to form an enclosure for a chassis 29 which mounts electronic equipment or the like, not shown.

Panels 12, 20 and 14 are provided with aligned openings therein for the reception of miniature light fixtures 30, only one of which fixtures is shown in Fig. 1. The light fixture 30, which is mounted on panel 20, includes an annular metal member 32 formed with outwardly extending flanges at the top and bottom thereof, with the bottom flange located beneath and in electrical contact with the bottom surface of conductor lamination 24 and with the top flange contoured to receive an offset portion of an annular insulating bushing 34. A second annular metal member 36 has as inwardly projecting flange at the bottom thereof with a top surface that fits under the offset portion of bushing 34 and a bottom surface in contact with the top surface of conductor lamination 26. Member 36 has an externally threaded portion at the top for receiving a lamp-access closure cap 38. Cap 38 is formed of metal with a conductor 40 attached to an inner flat surface, and with a sealing gasket 42 fitted on an outer cylindrical surface thereof.

A miniature electric lamp 44 is removably fitted within metal member 32, with a cylindrical terminal 45 of the lamp in electrical contact with member 32 and with a central terminal 47 of the lamp in electrical contact with conductor 40. A lamp filament 46 is electrically connected at one end to the cylindrical terminal 45 and at its opposite end to the central terminal 47. A red optical filter 48 surrounds the lamp bulb, which bulb projects into the opening in light-transmitting panel 12. In practice, where the plastic core 22 of panel 20 is formed as an optical filter, the filter 48 may be omitted from the lamp assembly. A pair of conductors 50 and 52 connect the panel conductor laminations 24 and 26, respectively, to a suitable source of electrical energy, not shown.

With conductors 50 and 52 connected across a suitable source of energy, current flows through conductor 50, conductor lamination 24, annular metal member 32 and the cylindrical terminal 45 of the lamp into the filament 46, and from the filament current flows through the central terminal 47 of the lamp, conductor 40 closure cap 38, annular member 36, conductor laminations 26, a connector and insulator 54 and conductor 52 back to the source of energy. With the lamp filament energized, light rays pass therefrom into the light-transmitting panel 12 wherein the light rays are reflected between the polished top and bottom surface by internal specular reflection. Certain of the light rays so transmitted through panel 12 are diffused by the light diffusing patch, or patches, 13 and reflected from panel 12 into and through the transparent core of panel 20 and into panel 14 wherein such rays are further diffused for illuminating the indicia 18 formed on such panel. As stated heretofore, the core of panel 20 may be colored for contrast or so as to operate as an optical filter. Also, in some installations it may be desirable that the core 22 of panel 20 be made opaque, in which case an opening must be cut through such opaque panel directly beneath the indicia on panel 14 for passage of light to the indicia.

In accordance with the Fig. 2 embodiment of this invention the transparent light-transmitting panel 12' and the indicia-bearing panel 14' are optically separated by an air space A, which air space is exaggerated in Fig. 2, and the current-carrying, lamp-mounting panel is mounted below the light-transmitting panel. As with the Fig. 1 embodiment, the light-transmitting panel 12' is made of highly transparent plastic with the upper and lower surfaces polished for specular reflection of light therebetween; indicia-bearing panel 14' is made of translucent, preferably white, plastic with an opaque coating or lamination 16' formed with indicia openings 18' on the obverse surface thereof; and the current-carrying, lamp-mounting panel 20' is formed with a plastic core 22' sandwiched between metal conductor laminations or printed circuits 24' and 26'.

Figure 2:
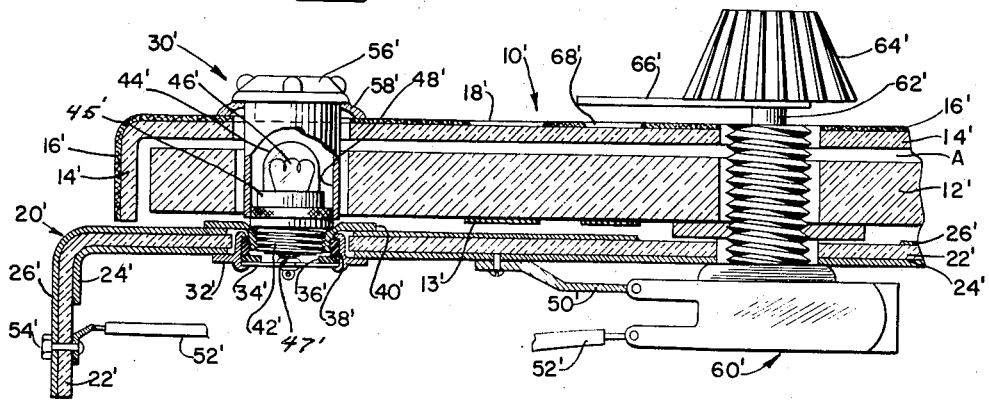
Fig. 2 is a sectional view, illustrating a second embodiment of the invention wherein a current-carrying and lamp-mounting panel is located below the light-transmitting panel of a duo-panel system.

As shown, in the Fig. 2 embodiment of the invention, the panel 14' is formed as an open-bottom, box-like structure which encloses and protects the light-transmitting panel 12', and if desired a sealing gasket, not shown, may be applied between the bottom edge of panel 14' and the adjacent top surface of panel 20'. Also, panel 20' is formed as a box-like structure for attachment to a mating box-like structure, not shown, in the same manner as described heretofore with reference to panel 20 of Fig. 1.

The lamp fixture 30' of the Fig. 2 embodiment is modified to take care of the location of lamp panel 20' below light-transmitting panel 12'. Here, the lamp fixture comprises a first annular metal member 32' formed with a lower peripheral flange for electrical contact beneath the bottom surface of conductor lamination 24' and with upper and lower inside flanges for reception of a metal conducting disk 34', an insulating washer 36' and an insulating ring 38'. Insulating ring 38' is internally threaded for reception of a second annular metal member 40', which member is formed with a peripheral flange that is placed in electrical contact with the top surface of conductor lamination 26'. Member 40' is threaded internally for the reception of a threaded ferrule 42' which retains a miniature lamp 44'. Lamp 44' includes a filament 46' having one end thereof connected to a central terminal 47' which central terminal is in electrical contact with the center of conductor disk 34'. An optical filter 48' surrounds the lamp bulb and is provided with a closure cap 56' and a sealing gasket 58'. The closure cap 56', gasket 58', filter 48', threaded ferrule 42' and lamp 44' are removable as a unit or subassembly from the threaded portion of the annular member 40'.

In accordance with the Fig. 2 embodiment of the invention, conductors 50' and 52', for transmitting current to conductor laminations 24' and 26', respectively, are connected to a source of electrical energy, not shown, through an on-off switch and dimmer combination 60'. Switch 60' is connected by a shaft 62' to an actuating knob 64'. Shaft 62' carries a pointer 66' which registers with indicia 68' appearing on the indicia panel 14' and which indicia may indicate the position of the on-off switch and dimmer.

In operation of the Fig. 2 embodiment of the invention, depending upon the setting of control knob 64', current flows from the source through switch 60', conductor lamination 24', annular member 32', disk 34', and lamp terminal 47' to the lamp filament 46', and from the filament, current flows through the cylindrical terminal 45', ferrule 42', annular member 40', conductor lamination 26', connector 54' and conductor 52' back to switch 60'. With the lamp or lamps, thus energized, light rays flow therefrom through optical filter 48' into the light-transmitting panel 12', through which the light rays are transmitted by total specular reflection between the polished top and bottom surfaces of such panel. In transmission through panel 12', certain of the light rays strike the patches 13' on the bottom surface of the panel and are diffusely reflected therefrom into indicia panel 14' for illuminating the indicia 18' and 68' formed thereon.

Although the base material of indicia panel, 14 of Fig. 1 and 14' of Fig. 2, has been described as of a translucent plastic formation, either or both of these panels may be formed of any one of a number of light pervious materials and may range from essentially transparent to translucent in light transmitting characteristics. Further, the material of the indicia panel may include a dye, a dye stuff or a colorant to give this panel a desired light filtering characteristic and render unnecessary the use of a color filter in the lamp fixture assembly. The class of materials including polyester plastic resin or silicone resin or bonded fibre glass laminations are particularly applicable since they may be formulated to have a wide range of light transmitting properties. An indicia panel employing such a glass-resin base stock will perform efficiently in a duo-panel system and at the same time possess unique structural strength and resistance to damage in severe military and civilian applications. Also, such materials may be formed into the box-like structures referred to heretofore.

Figure 3:
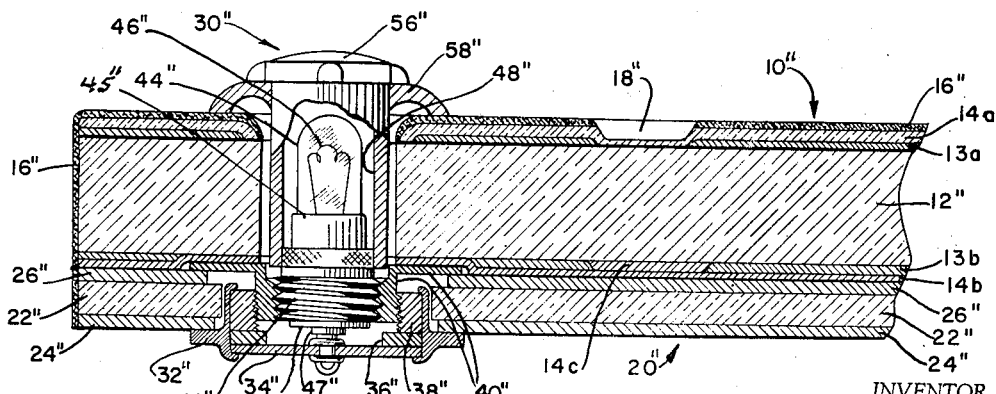
Fig. 3 is a sectional view, illustrating a third embodiment of the invention wherein a current-carrying and lamp-mounting panel is located below a uni-panel system.

In the Fig. 3 embodiment of the invention the illuminated panel 10'' is generally similar to that disclosed in applicant's copending application Serial No. 600,355 filed July 26, 1956 for Illuminated Panel Uninterrupted Translucent Lamination. Here, the panel 10'' comprises a light-transmitting panel 12'' constructed of a clear highly transparent plastic and having metallic reflective coatings on laminations 13a and 13b on the top and bottom surfaces thereof. Superimposed on metallic laminations 13a and 13b are white translucent coatings or laminations 14a and 14b, respectively, and superimposed on lamination 14a is a black opaque lamination 16, which last lamination continues around the sides of the panel, as shown on the left side of Fig. 3. At desired areas, portions of metallic laminations 13a and directly opposite portions of metallic lamination 13b are cut out or omitted and like areas of translucent laminations 14a and 14b are placed into optical contact with the top and bottom surfaces, respectively, of light-transmitting panel 12''. With this arrangement, indicia 18'' are formed on the obverse surface and light-diffusing areas 14c are formed on the reverse surface of panel 12''.

In accordance with the Fig. 3 embodiment of the invention, a current-carrying, lamp-mounting panel 20, is mounted beneath or to the rear of illuminable panel 10''.

As with the embodiments of the invention illustrated in Figs. 1 and 2, panel 20'' comprises a plastic core or sheet 22'' sandwiched between and forming insulation for a pair of metal conductor laminations or printed circuits 24'' and 26''. Light rays are not intended to pass through panel 20'', therefore, the core 22'' may be made of transparent, translucent or opaque plastic, as desired, and since lamination 14b on the bottom of panel 12'' forms an insulation, the top conductor lamination 26'' may be placed in physical contact with lamination 14b. Panel 20'' may be formed as an open-bottom, box-like structure for attachment to a mating box-like structure, not shown, in the same manner and for the same or similar purpose as described heretofore with reference to panels 20 and 20'.

Panels 10'' and 20'' are formed with aligned openings therein for the reception of a light fixture 30'', which light fixture is carried by panel 20'' and is substantially identical with light fixture 30' of the Fig. 2 embodiment. Assuming that conductor laminations 24'' and 26'' are connected across a source of electrical energy, current flows from such source through conductor 24'', annular member 32'', disk 34'', lamp terminal 47'' to the lamp filament 46'' and from the filament, current flows through the cylindrical terminal 45''; ferrule 42'', annular member 40'' and conductor lamination 26'' back to the source of current.

Thus, it is seen, in each of the illustrated embodiments of the invention, the lamps are carried by a separate panel, which panel also carried the conductors for supplying current to the lamps and other fixtures, and the lamps are readily accessible for inspection and/or replacement from the obverse side of the instrument with which the panel is used. In addition, the separate panel functions as an optical separator between the light-transmitting panel and indicia-bearing panel of a duo-panel system and as a support and enclosure for mounting switches, controls and the like; all without interfering with the basic illumination.

It should be understood, of course, that the foregoing disclosure relates to only preferred embodiments of the invention and that numerous modifications or alternations may be made therein without departing from the spirit and the scope of the invention as set forth in the appended claims.

What is claimed is:

1. A panel illumination system comprising a first panel formed of transparent light transmitting material and having substantially parallel upper and lower surfaces operative to specularly reflect light rays therebetween, means for introducing light rays into the light-transmitting panel, light diffusing means formed on the lower surface of the light-transmitting panel for diffusely reflecting light rays therefrom through the upper surface thereof, a second panel positioned adjacent the first panel, a light assembly carried by said second panel, said light assembly comprising a first subassembly including a lamp socket attached to the second panel and a second subassembly fitted into the lamp socket and having a light bulb extending therefrom into the first panel and forming the means for introducing light rays thereinto, and said second subassembly being removable as a unit from the upper surface of the first panel.

2. A panel illumination system as set forth in claim 1 wherein the second panel includes electric conductors for transmitting current to the light assembly carried thereby.

3. A panel illumination system as set forth in claim 1 which includes a third panel formed of light-pervious material and having indicia formed on an obverse surface thereof opposite the light diffusing means on the lower surface of the first panel and arranged in a manner as to receive light rays reflected from the upper surface of such first panel.

4. A panel illumination system as set forth in claim 3 wherein the second panel is positioned between the first and third panels in a manner as to optically separate such panels.

5. A panel illumination system as set forth in claim 3 wherein said second panel is positioned below the first panel and the third panel is positioned above and optically separated from the first panel.

6. A panel illumination system as set forth in claim 1 wherein the upper and lower surfaces of the first panel are covered with a metallic light reflecting material having openings therein with indicia formed in the opening in the upper surface and the light diffusing means formed in the opening in the lower surface of such panel.

7. In a duo-panel illumination system, means for illuminating a dial or the like comprising, a light transmitting panel operative to specularly reflect light rays introduced therein, a light diffusing panel including translucent indicia means formed on the obverse surface thereof mounted in parallel relationship with said light transmitting panel, a separating panel interposed between said light transmitting and light diffusing panels for optically separating such panels, a light fixture carried by said separating panel and having a light bulb thereof extending into the light transmitting panel for transmission of light rays thereinto, and reflecting means positioning on the under side of said light transmitting panels and operative to selectively reflect light rays from the light transmitting panel through the separating panel and into the light diffusing panel for illuminating the indicia means thereof.

8. A duo-panel illumination system as set forth in claim 7 wherein the separating panel includes means for conducting electric current to the light fixture carried by such panel.

9. A duo-panel illumination system as set forth in claim 7 wherein the separating panel is formed of a material having color filter characteristics for filtering light rays passing from the light transmitting panel into the light diffusing panel.

10. A panel illumination system comprising a first panel formed of transparent material and having substantially parallel upper and lower surfaces operative to specularly reflect light rays therebetween, means for introducing light rays into the light-transmitting panel, light diffusing means formed on the lower surface of the light-transmitting panel for diffusely reflecting light rays therefrom through the upper surface thereof, a second panel positioned adjacent the first panel, a light assembly carried by the second panel and having a light bulb extending therefrom into the first panel and forming the means for introducing light rays thereinto and said second panel being formed as a first open-sided box-like enclosure.

11. A panel illumination system as set forth in claim 10 wherein the first box-like enclosure at least partially encloses the first panel.

12. A panel illumination system as set forth in claim 10 which includes a second open-sided box-like enclosure arranged in mating relation with the first enclosure.

13. A panel illumination system as set forth in claim 12 wherein the first and second box-like enclosures enclose the first panel.

14. A panel illumination system as set forth in claim 10 wherein the second panel is formed of light pervious material having indicia formed thereon in line with the light diffusing means formed on the first panel.

15. A panel illumination system as set forth in claim 10 which includes a third panel formed of light pervious material having indicia formed thereon in line with the light diffusing means formed on the first panel, and wherein the second panel is located between the first and third panels for optically separating such first and third panels.

16. A panel illumination system as set forth in claim 15 wherein the third panel is formed of a material having color filter characteristics for filtering light rays from the first panel, No references cited.